United States Patent [19]

Hersom

[11] Patent Number: 4,839,980

[45] Date of Patent: Jun. 20, 1989

[54] ELECTRIC FISH LANDING NET

[76] Inventor: Dana A. Hersom, Rte. 4, Emmet Still Rd., Loganville, Ga. 30249

[21] Appl. No.: 202,384

[22] Filed: Jun. 6, 1988

[51] Int. Cl.⁴ ............ A01K 79/02; A01K 75/02; A01K 77/00
[52] U.S. Cl. .................................. 43/11; 43/17.1
[58] Field of Search ....................... 43/17.1, 12, 11

[56] References Cited

U.S. PATENT DOCUMENTS

| 2,745,205 | 5/1956 | Kafka | 43/17.1 |
| 2,818,672 | 7/1958 | Kreutzer | 43/17.1 |
| 3,849,926 | 11/1974 | Fox | 43/11 |

FOREIGN PATENT DOCUMENTS 90269  3/1957  Norway ........................... 43/17.1

*Primary Examiner*—Nicholas P. Godici
*Assistant Examiner*—Michael William Starkweather
*Attorney, Agent, or Firm*—Needle & Rosenberg

[57] ABSTRACT

A landing net capable of temporarily disabling a fish or other animal is provided, having a frame for supporting a collecting net, a handle for controlling the frame and net, and a controllable power source for supplying an electrical current to a contacting member located in the collecting net. When the animal touches the contacting member, it is shocked and temporarily disabled.

7 Claims, 1 Drawing Sheet

U.S. Patent        Jun. 20, 1989        4,839,980

ELECTRIC FISH LANDING NET

BACKGROUND OF THE INVENTION

This invention relates to a landing net which temporarily disables a fish or other captured animal. In particular, the landing net contains contacting strips capable of emitting a harmless disabling shock to the fish or animal with which it comes in contact.

Landing nets have traditionally been comprised of a woven collecting net, a loop-like frame from which the collecting net hangs, and a handle. This type of net has long been used by fisherman for bringing fish, once hooked and reeled in, into a boat or onto shore. Once captured, the fish typically thrashes about while the fisherman struggles to remove the hook. The fish, as well as the fisherman, often suffers damage during such confrontations. One solution for easier removal of the hook has been to kill the fish in the landing net.

More recently, however, a growing trend has been towards releasing fish back into their natural habitat after they are caught. This modern catch and release method is particularly popular with professional tournament and sport fisherman, and is to be encouraged from an ecological standpoint.

One problem incurred in the catch and release method, however, is that of damage caused to both the fish and the fisherman during removal of the hook from the fish. For example, unnecessary handling can cause saliva loss to the fish, which is known to result in greater susceptability of the fish to aquatic parasites after the fish is released back to its habitat. Also, any damage caused by the hook entering the fish's mouth is compounded while the hook is removed from the thrashing fish. On the other hand, sharp scales and teeth of the fish have been known to cause injury to the fisherman.

There exists a need, therefore, for a landing net which disables the fish so that the hook can be easily removed with minimal damage to both the fish and the fisherman.

SUMMARY OF THE INVENTION

The present invention is a landing net which emits an electrical current which in turn shocks and temporarily disables a captured fish or animal. The landing net has a frame from which hangs a collecting net, and a handle which is attached to the frame. Attached to the collecting net are a pair of contacting strips which contain metallic contact surfaces. These surfaces are electrically connected to a power source, which supplies power to the contact surface. The power source can be comprised of a transformer and a transistor oscillator unit with power supplied from one or more batteries. The power source and batteries can be housed in the handle, which is preferably hollow and made of the non-conductive plastic.

Additionally, a push button switching means may be provided for controlling the flow of electrical current from the power source to the contacting strip. This allows the current to be provided to the strip only when desired, and therefore decreases the likelihood of the user accidently shocking himself, as well as conserves power. A light emitting diode indicator may also be provided from visually indicating the flow of current from the power source to the contact strip. The switching means can be placed at or near a gripping area of the handle for easy access and the indicator can be placed on a frame yoke located at the point where the frame and handle connect.

When a fish is brought into the landing net, the operator pushes the switching means, which in turn results in the delivery of an electrical current from the power source to the contact surface and to the fish. The shock should be of a voltage which disables the fish, but which does not kill it. The fisherman can safely remove his hook, and the fish will eventually regain its orientation and be safely returned to its habitat. The disabling device of this invention is also useful to all commercial applications when the handling of stabilized fish is necessary, such as in fish grading, food production, and fish hatcheries. The disabling device allows a quick, efficient means of temporarily immobilizing the fish without harmful damages to the fish commodity.

It is an object of the present invention, therefore, to provide means of temporarily harmlessly disabling a fish or other animal caught in a net so as to allow safe and efficient handling.

It is a further object of the invention to provide such disabling means which is safe to use.

It is still further object of the invention to provide such disabling means which is lightweight and of simple design.

These and other objects and advantages will appear in the following description with reference to the drawing.

DETAILED DESCRIPTION OF THE DRAWINGS

The present invention is now described with reference to the drawings.

Figure 1:
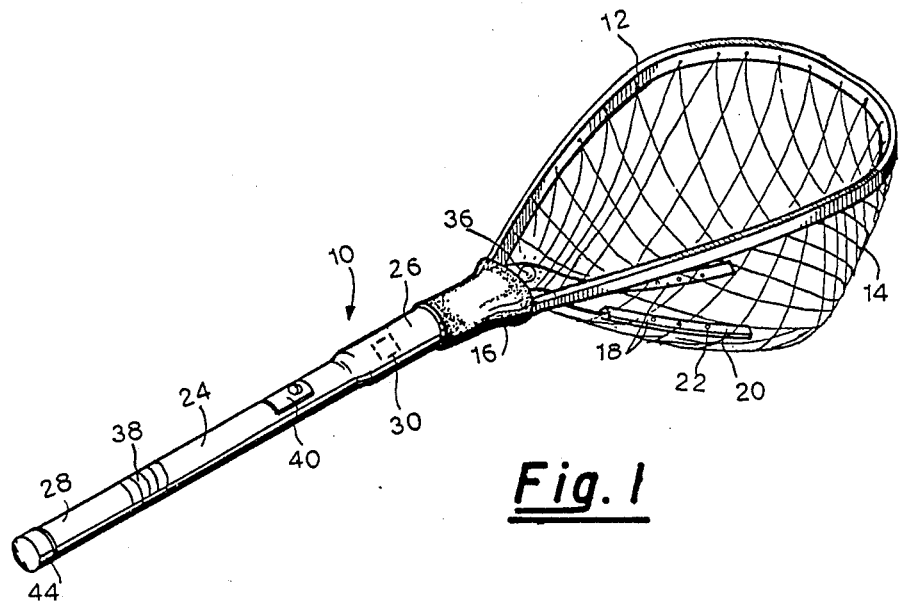
FIG. 1 is a partial cross-sectional view of the landing net of the present invention.

FIG. 1 is a cross-sectional view of the electrical landing net 10 of the present invention. A netting frame 12 provides structural support for a collecting net 14 used to entrap the fish. The frame 12 is preferably made of a thin metal rod, and the net 14 should be of a mesh-type material. A net frame yolk 16 holds the net frame 12 in stable position, and is preferably a cylindrically-shaped hollow piece of molded plastic.

Attached to the collecting net 14 is a pair of contacting members 18. It is preferred that each member 18 be comprised of a strip 20 of nylon material having a plurality of brass eyelet electrodes 22 held along its length. For best results, it is advised that the contacting members 18 be placed at the base of the net 14 so that they are certain to come in contact with the captured fish.

An electrical assembly 30 produces a high voltage low current electrical charge to the contacting members 18, and its circuitry is described more fully below in reference to FIG. 2. A pair of primary electrical wires 32, 34 carrying current from the electrical assembly 30 to the electrodes 22 in the contacting members 18. It is preferred that the wires 32, 34 be passed through the hollow frame yoke 16 to prevent tangling and to otherwise be protected.

A light 36 may also be provided for encouraging use of the device at night. The light 36 may be supplied electrical current from the electrical assembly 30, in which case it would also serve as an indicator that current is being transmitted to the contact members 18, or it may have an independent power source. For best results, it is recommended that the light 36 be placed on the frame yoke 16 so as to cast light onto the net 14. Alternatively, a light emitting diode may be included in the electrical assembly 30 to provide a separate indicator of activation of the electrical charge.

An elongated, cylindrical handle 24 is provided having a net end 26 and a battery end 28. The handle 24 is preferably hollow and made of strong plastic or other non-conductive material. The electrical assembly 30 is located within the net end 26 of the handle 24. A handle grip 38 is also provided for allowing the user to properly grasp the device 10. The grip 38 may be placed anywhere along the handle 24. However, for optimum stability and handling, the grip 38 should be placed closer to the battery end 28 of the handle 24 than to the net end 26. Located on the grip 38 is an activating switch 40. The switch 40 is electrically connected to the electrical assembly 30 and, when depressed, causes the power supply circuitry of the device to become closed, thereby emitting current to the contacting members 18. When the switch 40 is not depressed, the circuit remains open and no current reaches the members 18. It should be apparent that the positioning of the switch 40 should be such that it may be depressed with the thumb or finger of the hand holding the device 10.

While any source of power may be used in supplying power to the electrical assembly 30, it is preferred that disposable batteries be used. Located at the battery end 28 of the handle 24 is a battery-holding compartment in which batteries are to be placed. For instance, six standard 1.5 volt C-cells may be inserted along the length of the handle. Standard battery connection means 29 are located within the compartment, and wires are provided to complete the circuit between the batteries, the switch 40 and the electrical assembly 30. An end cap 44 may be used to seal the battery end 28 of the handle 24 and to hold the batteries in place.

Figure 2:
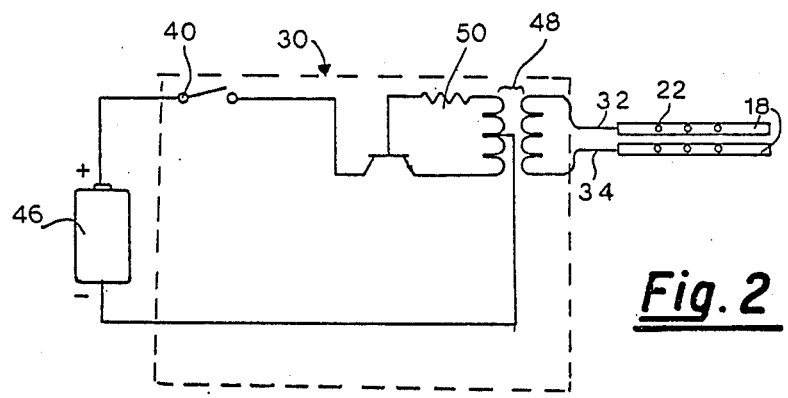
FIG. 2 is a circuit diagram of the electrical components of the landing net of the present invention.

FIG. 2 shows a preferred embodiment of the basic electronic circuit for producing the high voltage shock to a fish within the net. The electrical assembly 30 comprises the electrical components which form an oscillator and voltage step up circuit. Battery 46 represents the six 1.5 volt C-cells which therefore provides a 9 volt power source. This DC potential is placed across an oscillator circuit when switch 40 is closed to produce an AC current. The oscillator circuit is formed by an NPN transistor 47, and resistor 50, which has a resistance of 200 ohms. The primary winding of a step-up transformer with center tap 48 is in line with the AC current thereby produced. The transformer 48, which may have 200 turns in the primary winding and 3125 turns in the secondary winding, produces 3500 volts at 0.025 amps in the secondary winding. The electrodes 22 are connected to the two ends of the secondary winding of the transformer by primary electrical wires 32, 34.

To operate the device, the user captures the fish or other prey in the collecting net 14, and depresses the switch 40. An electrical current is emitted to the contacting members 18, and the fish, when simultaneously contacting at least one eyelet of each member 18, completes the circuit from the secondary winding of the transformer and is disabled. The amount of current delivered by the 9 volt battery 46, when administered for a relatively short period, should stun, and not kill, the fish. However, increases in voltage or time of delivery of the current will, if desired, kill the fish in a quick and clean manner.

While the invention has been described in detail with particular reference to the preferred embodiment thereof, it will be understood that variations and modifications can be effected within the spirit and scope of the invention as previously described and as defined by the claims.

What I claim is:

1. A hand-held landing net, capable of temporarily disabling a fish or other animal, comprising:
   (a) a collecting net having electrodes located in said landing net;
   (b) a frame and handle to which said collecting net and said electrodes are attached; and
   (c) means for applying an electrical potential, located in said handle, to said electrodes for applying an electrical shock to an animal that comes into simultaneous physical contact with said electrodes.

2. The landing net of claim 1, wherein said means for applying an electrical potential is comprised of:
   (a) a direct current power source for providing electrical current;
   (b) a transistor oscillator for converting direct current voltage output from said power source to a continuous alternate current voltage output;
   (c) a transformer for increasing the voltage from said oxcillator; and
   (d) means for conducting the alternating current from said transformer to said electrodes.

3. The landing net of claim 2, wherein said direct power source is a battery.

4. The landing net of claim 3, wherein said handle contains said battery, said transformer, and said transistor oscillator.

5. The landing net of claim 2, further comprising switching means located on said handle for controlling the flow of electrical current from said power source to said transistor oscillator.

6. The landing net of claim 5, further comprising a light emitting diode for indicating enablement of said means for applying an electrical potential.

7. The landing net of claim 1, further comprising a light for lighting the area surrounding said collecting net.

* * * * *